US005802066A

United States Patent [19]

Miyake et al.

[11] Patent Number: 5,802,066

[45] Date of Patent: Sep. 1, 1998

[54] MULTIPLEX BROADCAST RECEIVING METHOD AND RECEIVER WITH PROGRAM TYPE MEMORY

[75] Inventors: Takashi Miyake; Shoji Suenaga; Mutsurou Tanoue; Jun Miyamura; Shinichi Abe; Kazuhiro Kamiya, all of Kawagoe, Japan

[73] Assignee: Pioneer Electronic Corporation, Tokyo, Japan

[21] Appl. No.: 426,611

[22] Filed: Apr. 21, 1995

[30] Foreign Application Priority Data

Apr. 27, 1994 [JP] Japan .................................... 6-089553

[51] Int. Cl.$^6$ ................................ H04J 3/12; H04B 1/18

[52] U.S. Cl. .................. 370/527; 455/152.1; 455/161.2; 455/161.3; 455/186.1

[58] Field of Search .............................. 370/110.4, 110.1, 370/69.1, 71, 73, 496, 522, 527, 480, 485, 486, 493, 495, 487, 490; 455/154.1, 186.1, 158.4, 161.3, 161.2, 184.1, 152.1, 160.1, 185.1, 158.5

[56] References Cited

U.S. PATENT DOCUMENTS

| | | | |
|---|---|---|---|
| 5,152,011 | 9/1992 | Schwob | 455/158.5 |
| 5,220,682 | 6/1993 | Tomohiro | 455/161.2 |
| 5,345,607 | 9/1994 | Liman et al. | 455/186.1 |
| 5,404,588 | 4/1995 | Henze | 455/186.1 |
| 5,428,825 | 6/1995 | Tomohiro et al. | 455/186.1 |
| 5,497,372 | 3/1996 | Nankoh et al. | 370/480 |

FOREIGN PATENT DOCUMENTS

| | | | |
|---|---|---|---|
| 0 498 233 A3 | 8/1992 | European Pat. Off. . | |
| 0 602 438 A1 | 6/1994 | European Pat. Off. . | |
| 0 602 438A1 | 11/1993 | Japan | H04H 1/00 |
| WO 94/08407 | 4/1994 | WIPO . | |

*Primary Examiner*—Wellington Chin
*Assistant Examiner*—Melissa Kay Carman
*Attorney, Agent, or Firm*—Evenson, McKeown, Edwards & Lenahan, PLLC

[57] ABSTRACT

Multiplex broadcast receiving method and receiver which can easily update the preset contents of classification information, such as a program type, in an RDS broadcasting. The RDS receiver is constituted by a memory control section for storing the classification information (PTY code) demodulated from RDS broadcast waves which are being received into a PTY memory; the PTY memory for storing the classification information; and a station selecting section for selecting a station of the multiplex broadcast waves regarding the classification information by reading out the classification information from the PTY memory. This enables the use of the classification information of the broadcasting station being received as it is, so that the user can store the favorite program type by a simple operation.

7 Claims, 4 Drawing Sheets

MULTIPLEX BROADCAST RECEIVING METHOD AND RECEIVER WITH PROGRAM TYPE MEMORY

BACKGROUND OF THE INVENTION

1. Field of the Invention

The present invention relates to a receiver for receiving what is called a radio data system (RDS) broadcasting and, more particularly to a broadcast station selecting method for selecting a station by using information of the program type (PTY code).

2. Description of Background Information

RDS broadcasting is a multiplex broadcasting in which additional information which is highly useful especially in a radio installed in a car or the like is multiplexed to a voice signal. The additional information includes station selection information necessary for specifying a broadcasting station in a district, traffic information, and the like and is standardized as a format of the RDS broadcasting.

A data format of the RDS broadcasting includes not only the voice signal but also digital data such as program ID information (PI code), group type code, PTY code, and the like. Among them, the PTY code is used to identify a type of program (music program, news program, sports program, or the like). The PTY code is a code of five bits which can designate total 32 kinds of program types of code numbers 0 to 31.

Conventionally, a receiver for searching (retrieving and receiving) broadcast waves of desired broadcast contents by using the PTY code by a simple operation is being developed (Japanese Patent Kokai No. 4-336809). According to the RDS receiver, while the program type of the reception broadcast waves can be known by checking the PTY code of the RDS broadcast waves which are received, an RDS broadcasting station having the desired broadcast contents can be retrieved on the basis of the PTY code which has been prepared in the receiver.

FIG. 1 shows a conventional RDS receiver for searching by the PTY code.

Inputted multiplex broadcast wave is demodulated by a tuner 2 and a voice signal is generated from a speaker 4 via an amplifier 3. The PTY code which is being received (hereinafter, referred to as a reception PTY code) is detected and held by a decoder 5. In performing a searching operation, the RDS receiver starts the operation as shown in a flowchart of FIG. 2.

At first, a control section 8 sets the first frequency in a reception frequency band to be scanned (scanned and retrieved) to a PLL circuit 10 (step S10). A judgment signal indicating whether a broadcasting station exists or not is supplied from the tuner 2 tuned to such a frequency to the control section 8. In the case where the broadcasting station exists and the broadcast wave from the station can be received (YES in step S11), the control section 8 checks to see if the digital data which should be included in the RDS broadcasting has been synchronized in the decoder 5 or not (step S12). When it is synchronized (YES in step S12), the PTY code which is obtained from the received station is temporarily stored as a reception PTY (step S13). Subsequently, the PTY code (hereinafter, referred to as a set PTY code) according to a desired reception program type which has been preliminarily designated by the user who uses an operating section 11 is called from a PTY memory 7 and is compared with the reception PTY (step S14).

The reception PTY code and the set PTY code are compared by a comparing section 9. When both of the codes coincide, since it denotes that the broadcasting station having the desired program type is being received, the searching operation is finished (YES in step S14) and the reception is started (step S15). When they don't coincide (NO in step S14), the searching operation is continued.

In the conventional RDS receiver, when the user allocates the program types to channel keys of the operating section 11, it is necessary to store the channel number corresponding to the PTY code into the PTY memory 7. Such an operation is executed by setting an operation mode which is exclusively used for memory input such as a preset mode or the like separately from the ordinary searching operation.

In the presetting operation, the user instructs a preset mode from the operating section 11 to the control section 8. The control section 8, thus, forms a PTY code for setting and displays the program type corresponding to such a PTY code by a display 12. By watching the display 12, the user allows the program types to be sequentially displayed by depressing an operation key to instruct "feed" or the like until the desired program type is displayed. When the desired program type is displayed, an operation such that the channel key of the number to which the user wants to store is depressed (for example, when the user wants to store into channel number 1, the channel key "1" is continuously depressed for two seconds) or the like is executed. By such an operation, the channel number is stored into the PTY memory 7 in relation to the program type and can be used for a call in the later searching mode.

In the conventional RDS receiver, however, as it will be understood from the storing method in the preset mode, whenever the contents of the PTY memory are changed, the presetting operation has to be executed again.

For instance, in the case where the user likes the broadcast contents of the RDS broadcasting station which is being received (it is assumed that the RDS broadcasting station has the program types which are not preset), after the user confirmed the program type of the RDS broadcasting station which is being received at present and is displayed by the display, the user selects the relevant program type by designating the preset mode and adding the relevant program type to the PTY memory as new updated contents.

OBJECTS AND SUMMARY OF THE INVENTION

An object of the present invention is, therefore, to provide a multiplex broadcast receiver which can easily update preset contents of classification information such as a program type or the like.

According to the first aspect of the invention, in a multiplex broadcast receiving method for receiving a multiplex broadcast wave in which classification information is superimposed on a main signal, the classification information demodulated from the multiplex broadcast wave being received is stored and a multiplex broadcasting station is selected on the basis of the classification information having been stored.

According to the second aspect of the invention, a multiplex broadcast receiver for selecting a station transmitting a multiplex broadcast wave in which the classification information is superimposed to the main signal, on the basis of classification information set by a user which has been preliminarily stored, comprises: a memory for storing the classification information; memory control means for storing the classification information demodulated from the multiplex broadcast wave being received into the memory; and station selecting means for reading out the classification information from the memory and executing the station selecting operation of the multiplex broadcast waves according to the classification information.

According to the third aspect of the invention, in the multiplex broadcast receiver according to the second aspect of the invention, there is provided a multiplex broadcast receiver in which a user set classification information which has preliminarily been stored in the memory and reception classification information demodulated from the multiplex broadcast wave being received are compared and the station selecting operation is performed on the basis of the comparison result, wherein when the user set classification information and the reception classification information are different, the memory control means newly stores the relevant reception classification information into the memory.

According to the fourth aspect of the invention, in the multiplex broadcast receiver according to the second and third aspects of the invention, a plurality of kinds of classification information can be stored into the memory and the station selecting means selectively reads out the relevant plurality of kinds of classification information.

According to the first aspect of the invention, since the classification information itself demodulated from the received broadcast waves is stored instead of the prepared classification information, the classification information can be easily updated.

According to the second aspect of the invention, the memory control means has a function to store the classification information demodulated from the multiplex broadcast waves which are being received into a memory. The memory stores therein the classification information by the memory control means. In selecting a station at a later time, the station selecting means directly reads out the stored classification information from the relevant memory and selects a station of a multiplex broadcast wave having program type information according to the classification information.

According to the third aspect of the invention, user set classification information has preliminarily been stored in the memory. On the other hand, the memory control means demodulates the reception classification information from the multiplex broadcast waves which are being received and compares with the user set classification information stored in the memory. In the case that the user set classification information and the reception classification information are determined to be different according to the comparison result, the memory control means newly stores the relevant reception classification information into the memory and updates the memory contents.

According to the fourth aspect of the invention, since the plurality of kinds of classification information can be orderly stored into the memory, the station selecting means can perform the station selecting operation by selectively reading out the relevant plurality of kinds of classification information.

DETAILED DESCRIPTION OF THE EMBODIMENTS

Preferred embodiments according to a multiplex broadcast receiver of the invention will now be described with reference to the drawings.

(i) First Embodiment

Figure 1:
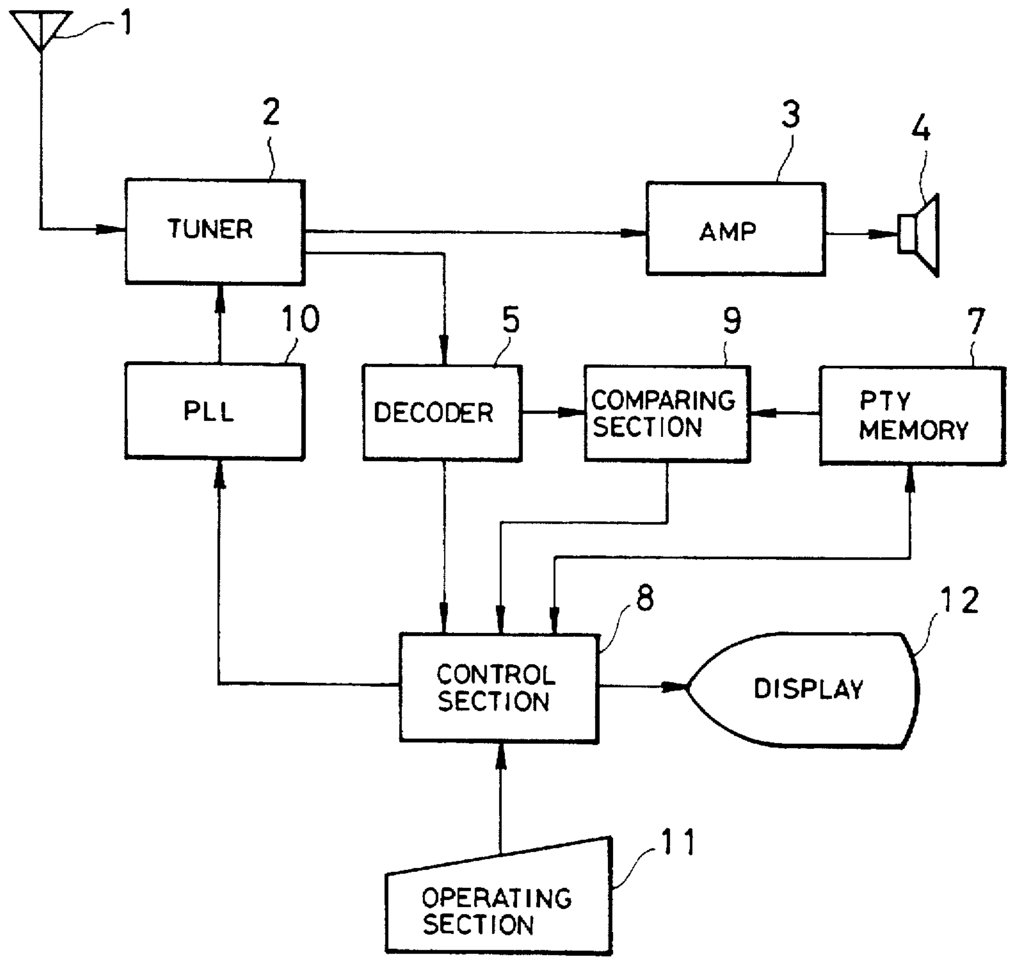
FIG. 1 (PRIOR ART)
FIG. 1 is a block diagram showing a conventional radio data system receiver.
Figure 2:
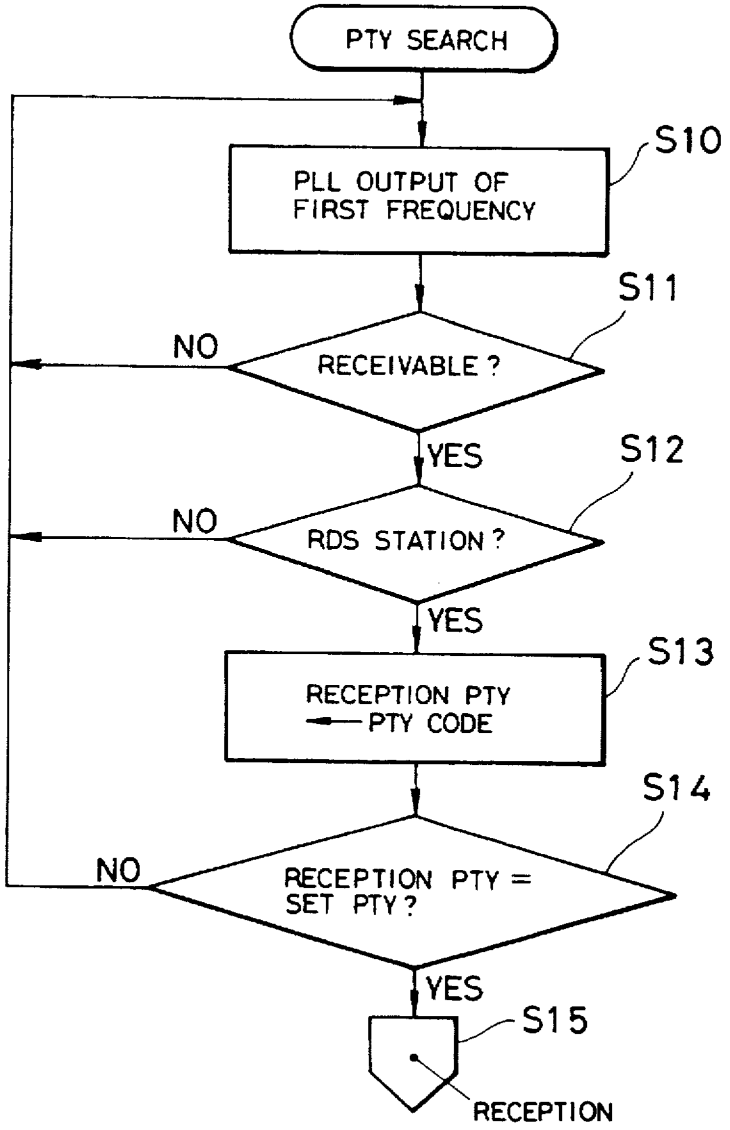
FIG. 2 is a flowchart for explaining a PTY searching operation.
Figure 3:
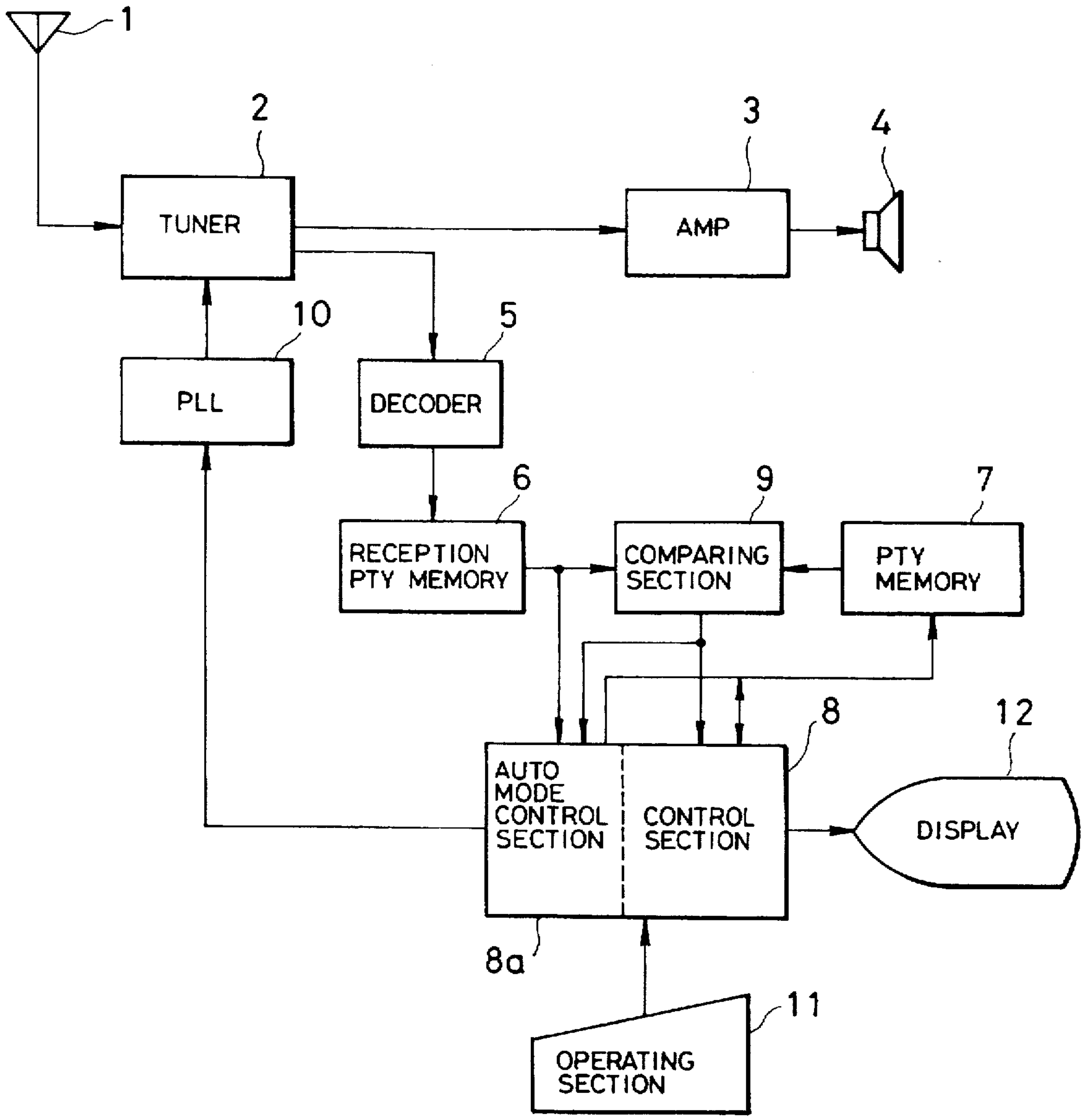
FIG. 3 is a block diagram showing a radio data system receiver according to an embodiment of the invention.

FIG. 3 shows a construction of an embodiment of the invention. As shown in FIG. 3, an RDS receiver of the embodiment comprises an antenna 1 for receiving broadcast waves; a tuner 2 for selecting the station of the received broadcast waves and demodulating; an amplifier 3 for amplifying a demodulated voice signal; and a speaker 4 for generating a voice, wherein the last two elements constitute an audio system.

A system associated with the station selection comprises: a decoder 5 for decoding additional information as digital data; a reception PTY memory 6 for temporarily storing the PTY code decoded by the decoder 5; a PTY memory (or memory for setting) 7 for storing the PTY code for setting; the comparing section 9 for comparing the contents of the reception PTY memory 6 with those of the PTY memory 7; a control section 8 for controlling the above component elements; a PLL circuit 10 for setting a receiving frequency by the control section 8; a operating section 11 by which the user instructs; and a display 12 for displaying the receiving frequency and the program type which is being received or in the preset mode to the user.

The control section 8 has an automatic mode control section 8*a* for directly storing the contents of the reception PTY memory 6 into the PTY memory 7 when the automatic mode is set by the user. The automatic mode is designated by the operation of the user and denotes an operation such that, for example, when the user depresses a channel key, the channel number corresponding to the depressed key and the relevant PTY code of the RDS broadcasting station which is being received are made correspond and are stored into the PTY memory 7 as a setting PTY.

The operating section 11 comprises: mode keys for setting the operation mode such as automatic mode, search mode, preset mode, or the like by the designation of the user; channel keys for setting the channel number corresponding to the PTY code into the PTY memory 7; station selection keys for selecting the reception frequency, and the like.

The operations of the first embodiment will now be described with reference to a flowchart of FIG. 4.

Hitherto, it is necessary to preset the program type before setting the search mode. In the embodiment, however, the PTY code according to the RDS broadcast which in being received is directly stored into the memory. The user, therefore, sets the operation mode to the automatic mode by the operating section 11.

Assuming now that after the automatic mode was designated, the user sets a proper frequency by operating the station selection key of the operating section 11 (step S1). The control section 8 generates the set frequency information to the PLL circuit 10. The PLL circuit 10 sets an internal frequency synthesizer or the like to the designated reception frequency. The tuner 2 tunes to the reception frequency and the waves are supplied from the antenna 1 and are demodulated. Such station selecting operations can be also executed on the basis of the searching operation by the ordinary frequency scan.

In the case where the broadcast waves of the RDS broadcasting station is received, digital data is synchronized by the decoder 5. The decoder 5 recognizes the PTY code (reception PTY code) included in the digital data and stores into the reception PTY memory 6 (step S2). The control section 8 reads out the reception PTY code and displays on the display 12 the corresponding program type together with the reception frequency information of the RDS broadcasting station which is being received.

Assuming now that the broadcast contents of the broadcast wave being received are favorable to the user, who thinks that it is desirable to recall the program type, for instance, the music genre again in the later search. In this instance, the user depresses a proper channel key of the operating section 11. For example, in case of setting the program type to channel number 1, the channel key '1' is depressed. In order to prevent an erroneous input, it is preferable to construct in a manner such that the key is effective only when the key is continuously depressed for a predetermined time (for instance, two seconds) and the corresponding channel number is stored in the memory.

The automatic mode control section 8a recognizes it and checks to see if the set mode is the automatic mode or not (step S3).

When the automatic mode is not designated (NO in step S3), the designation is ignored. When the automatic mode is designated (YES in step S3), the automatic mode control section 8a reads out the reception PTY code from the reception PTY memory 6. Simultaneously, the channel number regarding the designated channel key is recognized. For example, when the channel key '1' is depressed as mentioned above, it is recognized as channel number 1. The channel number and the PTY code which is being received are, further, stored into the relevant memory area in the memory 7 for setting so as to correspond each other (step S4).

According to the first embodiment as mentioned above, the user can easily store the new PTY code by merely designating the channel.

(ii) Second Embodiment

In the first embodiment, the reception PTY code is directly stored into the memory when the automatic mode is set. In the second embodiment, the stored contents are further examined in order to eliminate an overlap storage.

Since a construction of the second embodiment is similar to that of the first embodiment, its description is omitted here.

Operations will now be described hereinbelow.

Figure 4:
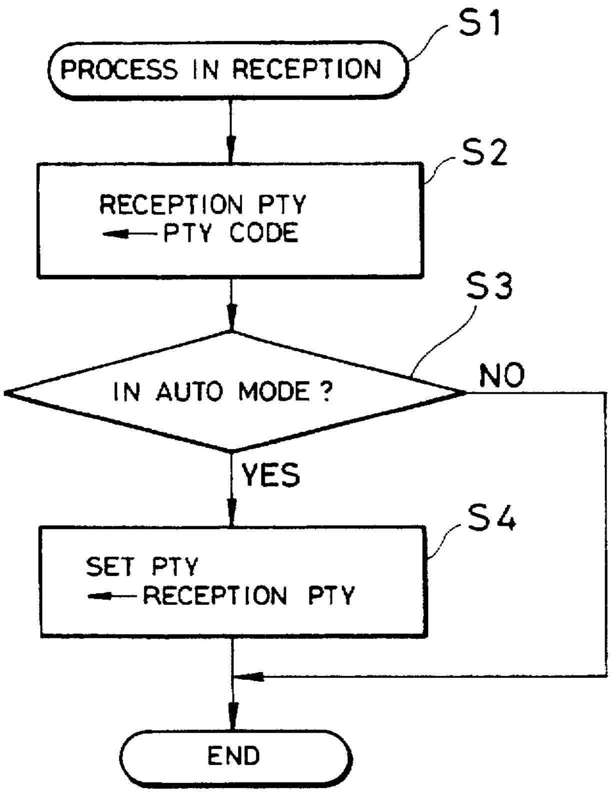
FIG. 4 is a flowchart for explaining a processing operation during the reception.

In step 4 in FIG. 4, the automatic mode control section 8a sequentially calls the PTY codes stored in the PTY memory 7 and sends to the comparing section 9. For example, the PTY codes are sequentially sent in accordance with the order from the small code number. In the RDS broadcasting, since the total number of PTY codes is equal to 32 kinds, it doesn't take a long time to scan all of them.

On the other hand, the reception PTY code is directly supplied from the reception PTY memory 6 to the comparing section 9. When both of the PTY codes coincide, the comparing section 9 supplies a detection signal to the automatic mode control section 8a.

In the case where the reception PTY code has already been stored in any memory area of the PTY memory 7, the comparing section 9 supplies the detection signal indicative of the coincidence to the automatic mode control section 8a. That in, since the program type indicative of the same contents as those of the relevant RDS broadcast which is being received has already been set in the PTY memory 7 in this case, it is unnecessary to newly store it.

When the coincidence data is not supplied to the automatic mode control section 8a even after all of the PTY codes in the PTY memory 7 were scanned, the relevant program type has not been stored in the past. The automatic mode control section 8a stores the relevant reception PTY code together with the designated channel number into the PTY memory 7. In the case where the relevant program type has already been stored in this instance, such a state can be also displayed by the display 12.

According to the second embodiment as mentioned above, since the overlapped data can be eliminated before storing by using the conventional comparing function, the memory can be fully used.

Other Modifications

The invention is not limited to the foregoing embodiments but various modifications are possible.

For example, in the embodiments, although the automatic mode and the other manual modes have been switched by the designation of the user from the operating section, the mode can be also selected simultaneously with the switching of the reception band. Particularly, in case of the RDS broadcasting, since the broadcasting has been performed only in the specific frequency band, it is sufficient to switch to the automatic mode interlockingly with the selection of the specific band.

Although the input to the PTY memory has been performed by depressing the channel key or the like by the user in the embodiments, it is also possible to automatically execute such an operation.

For example, the automatic mode control section can also control in a manner such that the PTY code of the broadcasting station which is being received is automatically stored into the PTY memory when one RDS broadcasting station in continuously received for a predetermined time. By such a control, the broadcasting station which is tost frequently received is always updated and registered in the PTY memory. It is also valid when there is one key to input. In the later searching operation, therefore, the broadcasting station according to a recent preference of the user is selected.

According to the invention as mentioned above, since the method of directly storing the classification information of the broadcast waves which are being received is used, the user can store the favorite program type by a simple operation and it is convenient in the later station selecting operation.

As in the invention recited in the appended claim, the user set classification information and the reception classification information demodulated from the multiplex broadcast wave being received are compared, there is no overlap registration and the memory can be effectively used.

Further, by storing a plurality of kinds of classification information into the memory, necessary classification information can be selectively read out from the plurality of kinds of classification information.

What is claimed is:

1. A multiplex broadcast receiving method for receiving a multiplex broadcast wave in which classification information is superimposed on a main signal, comprising the steps of:

storing the classification information demodulated from a multiplex broadcast wave being received into a program type memory in which data of program types to be received is stored; and selecting a station broadcasting a multiplex broadcast wave as a receiving station on the basis of said classification information having been stored.

2. A multiplex broadcast receiver for selecting a station transmitting a multiplex broadcast wave in which the classification information is superimposed on a main signal, on the basis of classification information which has previously been stored, comprising:

a program type memory for storing classification information pieces each representing a program type to be received;

memory control means for storing classification information demodulated from a multiplex broadcast wave being received into said program type memory;

station selecting means for reading out said classification information from said program type memory and executing a station selecting operation to select a multiplex broadcast wave according to said classification information.

3. A receiver according to claim 2, further comprising means for comparing user set classification information which has preliminarily been stored in said memory and reception classification information demodulated from said multiplex broadcast wave being received, wherein said receiver is adapted for executing the station selecting operation on the basis of a comparison result, and wherein said memory control means newly stores said reception classification information into said memory when said uset set classification information and said reception classification information are different from each other.

4. A receiver according to claim 2, wherein said memory has a capacity for storing a plurality of pieces of classification information and said station selecting means selectively reads out a classification information piece from among said plurality of pieces of classification information.

5. A receiver according to claim 3, wherein said memory has a caracity for storing a plurality of pieces of classification information and said station selecting means selectively reads out a classification information piece from among said plurality of pieces of classification information.

6. A multiplex broadcast receiver as claimed in claim 2, wherein said receiver has a plurality of channel keys for respectively designating a channel number of a multiplex broadcast wave to be received, and wherein said memory control means stores a piece of classification information demodulated from a multiplex broadcast wave being received into said memory in combination with an identification number of one of said channel keys operated to designate said multiplex broadcast wave.

7. A receiver according to claim 2, further comprising means for inhibiting said memory control means from storing the classification information demodulated from said multiplex broadcast wave being received into said program type memory, thereby allowing a user to manually store the classification information into said program type memory.

* * * * *